United States Patent [19]
Pagella et al.

[11] 3,831,283
[45] Aug. 27, 1974

[54] PRECISION MEASURING APPARATUS WITH GUIDES IN PNEUMOSTATIC BEARINGS

[75] Inventors: Elio Pagella; Carlo Guerci, both of Ivrea, Italy

[73] Assignee: Ing. C. Olivertti & Co., S.p.A., Ivrea (Torino), Italy

[22] Filed: July 7, 1972

[21] Appl. No.: 269,908

[30] Foreign Application Priority Data
July 9, 1971  Italy.................................. 69339/71

[52] U.S. Cl.......... 33/174 R, 33/174 L, 33/174 TA, 33/DIG. 2
[51] Int. Cl. ............................................. G01b 5/00
[58] Field of Search.......... 33/1 M, DIG. 2, 174 TA, 33/174 R, 174 L, 189; 308/5, DIG. 1

[56] References Cited
UNITED STATES PATENTS

| | | | |
|---|---|---|---|
| 3,218,108 | 11/1965 | Sazavsky............................ | 308/5 R |
| 3,260,162 | 7/1966 | Atherton............................ | 308/5 R |
| 3,447,840 | 6/1969 | Gress................................. | 308/5 R |
| 3,594,908 | 7/1971 | Pagella............................... | 33/174 L |
| 3,639,993 | 2/1972 | Sartorio............................. | 33/174 L |

*Primary Examiner*—Louis R. Prince
*Assistant Examiner*—Charles E. Phillips
*Attorney, Agent, or Firm*—Ira J. Schaefer

[57] ABSTRACT

A measuring apparatus comprises a portal formed by uprights spanned by a cross-piece and slidable on guides of a base by means of pneumostatically supported bearings, a slide carrying a feeler and slidable on guides of the cross-piece by means of pneumostatically supported bearings, at least one pressure regulator arranged to regulate the pressure of the air passing through it to one or more bearings and co-operating with a cam to produce a relative movement of the regulator with respect to the cam during the shifting of the slide or the uprights with respect to the cross-piece or the base.

The feeler is carried by an arm slidable in the slide, substantially in the form of an isosceles trapezoid, pneumostatically supported bearings being arranged between the slide and the larger face and between the slide and the inclined faces of the arm.

10 Claims, 15 Drawing Figures

PRECISION MEASURING APPARATUS WITH GUIDES IN PNEUMOSTATIC BEARINGS

BACKGROUND OF THE INVENTION

The present invention relates to a precision measuring apparatus with guides in pneumostatically supported bearings; this pneumostatic support enables the position of some of the bearings to be varied with respect to the corresponding bearing surfaces of the guides to correct variations of position or set of some parts of the apparatus which are produced by movements or elastic deformations of parts of the apparatus.

Measuring apparatuses are known which comprise a feeler arranged to co-operate with predetermined parts of a piece to be measured, measuring means adapted to generate signals corresponding to the movements effected by the feeler to bring itself from one position to a following position, and means for indicating the measurements which are carried out.

The structure of these measuring apparatuses normally comprises a portal or upstanding frame slidable on guides of a base and a slide slidable, in turn, on guides of the cross-piece of the portal and provided with an arm adapted to support the aforesaid feeler. Between the guides of the base and of the cross-piece and between the coupled surfaces of the portal and the slide there may be arranged pneumostatically supported bearings by means of which the aforesaid movements can be performed with very low friction.

The measuring apparatuses of the type described are liable to measuring errors the value of which depends on the position of the slide with respect to the cross-piece. In fact, during the movements of the slide, the values of the loads acting on the various bearings of the station vary, and, since this variation produces a relative shifting of the bearings with respect to the corresponding bearing surfaces, variations in the position or set of the portal with respect to the base occur. Moreover, the elastic deformations, in particular of the cross-piece of the portal, which are different according to the position that the slide has with respect to the cross-piece itself, also produce measuring errors.

SUMMARY OF THE INVENTION

The object of the invention is to provide a precision measuring apparatus with guides in pneumostatic bearings which enables the drawbacks hereinbefore mentioned to be eliminated.

According to the present invention, there is provided measuring apparatus comprising a portal formed by uprights spanned by a cross-piece, the uprights being slidable on guides of a base by means of pneumostatically supported bearings, a slide carrying a feeler and which is slidable on guides of the cross-piece by means of pneumostatically supported bearings, and means arranged to vary automatically the pressure of the air fed to one or more of these bearings to correct variations in the set of the slide with respect to the base which are produced by movements of the slide with respect to the cross-piece or deformations of the cross-piece.

BRIEF DESCRIPTION OF THE DRAWINGS

For a better understanding of the present invention, a description of a particular embodiment thereof will now be given by way of example, with reference to the accompanying drawings, in which.

GENERAL DESCRIPTION

Figure 1:
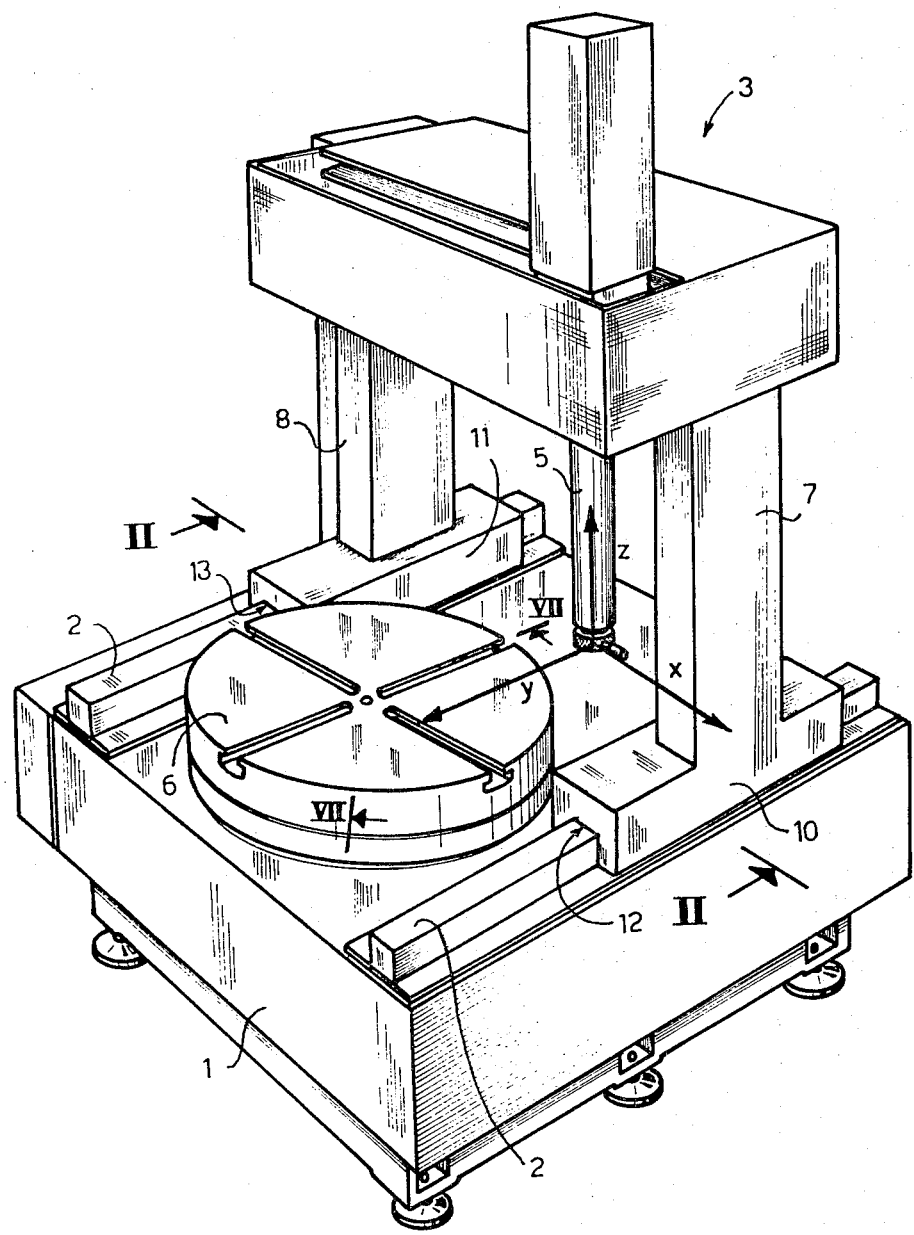
FIG. 1 is a front perspective view of the measuring apparatus embodying the present invention.

Referring, first of all, to FIG. 1, the measuring apparatus comprises a base 1 provided with a pair of guides 2, a portal, indicated as a whole by the reference 3, which is slidable on the guides 2, a slide 4 slidable with respect to the portal in a direction at right angles to that of the guides 2 and provided with a vertical arm 5 adapted to receive at its lower end a suitable feeler (not shown). On the base 1 there is arranged a workpiece table 6 rotatable about a vertical axis at right angles to the plane of the base.

The portal 3 comprises a pair of uprights or posts 7, 8 connected by a cross-piece 9 (FIG. 3) and the bases of which, 10 and 11 (FIG. 1), respectively, have grooves 12, 13 arranged to mate with the guides 2 of the base 1. These guides, which are of rectangular section, act as sliding seats during the movement of the portal 3 with respect to the base 1. The arm 5 is slidable perpendicular to the plane of the guides 2 with respect to the slide 4, and, therefore, the feeler which is fixed to the arm can be moved substantially in three directions x, y, z at right angles to each other indicated in FIG. 1 and coinciding with the sliding directions respectively of the slide 4 with respect to the corss-piece 9, of the portal 3 with respect to the base 1 and of the arm 5 with respect to the slide 4. The workpiece table 6, on the other hand, is rotatable about an axis parallel to the axis z.

Figure 2:
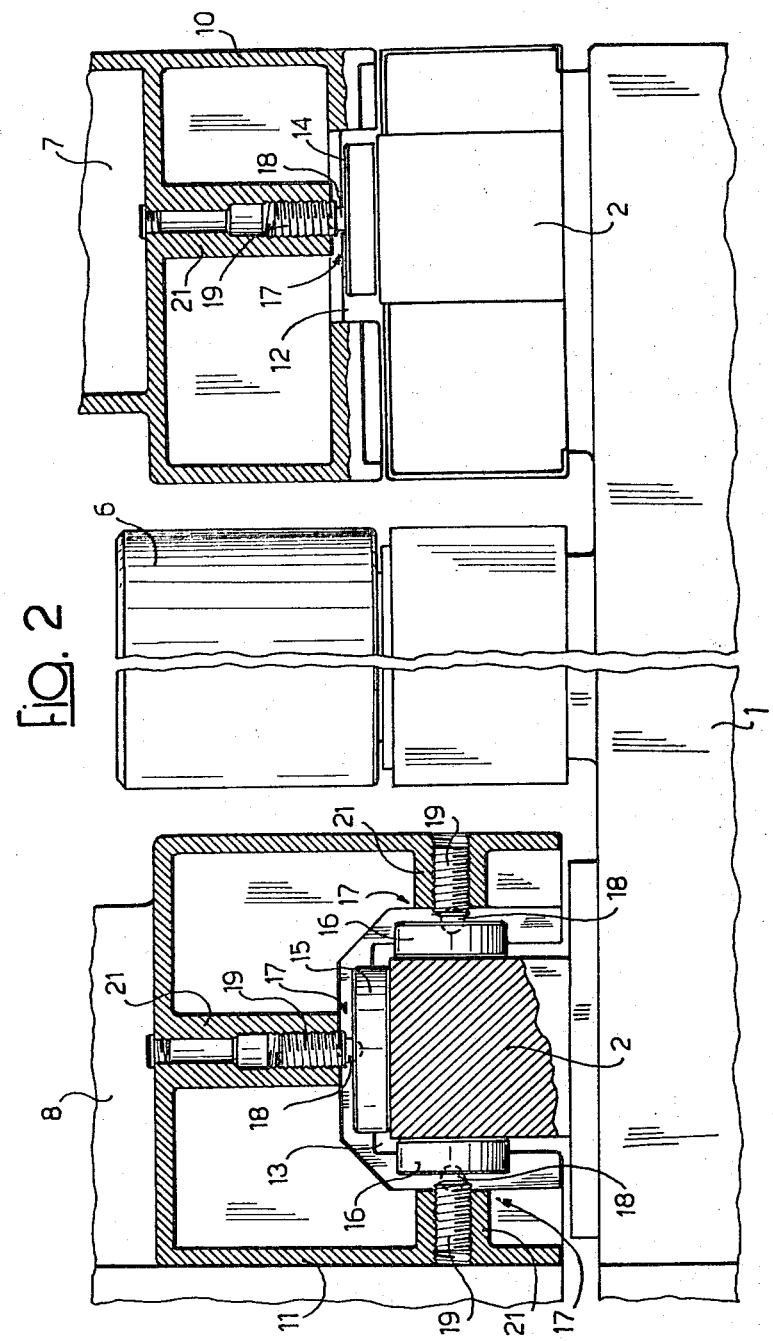
FIG. 2 is a partial section of the bases of the uprights of the portal forming part of the apparatus of FIG. 1, the section being taken in the plane of the line II—II.

Two sets of pneumostatically supported bearings are arranged to support the portal 3 on the guides 2 of the base 1, one of these sets being shown in FIG. 2. Each of these sets is arranged in the same plane and symmetrically with respect to the mid line of the uprights 7 and 8. Each set comprises two bearings 14 and 15 (FIG. 2) with a load-bearing function, which are arranged to bear on the top surface of the two guides 2 respectively, and two bearings 16 with a lateral centering function which are arranged to bear on the lateral surfaces of one of these guides. The bearings 14 and 15 which are load-bearing therefore form four supports for the portal 3 which are disposed at the corners of a rectangle.

Each bearing, which is known per se, is constituted by a plate, for example a disc, in the surface of which in proximity with the guide 2 there are formed ducts or cavities (not shown) for the air which is supplied to them through suitable holes in the plate in communication with conduits of a compressed-air distribution system. These bearings are connected to the bases 10 and 11, for example by means of ball joints, each of which is indicated as a whole by the reference 17. Each joint comprises a ball 18 housed in conical seats both in the bearing and in the end of a threaded pin 19 screwed into a corresponding sleeve 21 integral with the walls of the bases 10 and 11. By adjustment of the axial position of each pin 19 with respect to the corresponding sleeve 21 (effected by suitably screwing in and unscrewing the pin), it is obviously possible to adjust the set of the portal with respect to the surfaces of the guides 2.

As can be seen in FIG. 2, guide bearings co-operating with the lateral surfaces of the guide 2 are absent in the base 10, since the two pairs of bearings 16 disposed in the base 13 are sufficient for the lateral centering action.

The cross-piece 9 (FIG. 4) of the portal 3 is of substantially rectangular section and is provided with two pairs of guides, upper guides 25 and lower guides 26, the former contained in a single plane parallel to the plane $x, y$ (FIG. 1) and the second inclined with respect to this latter plane. The planes containing the guides 26 form a dihedral angle substantially of 90°. The cross-piece 9 is connected at its ends to the uprights 10 and 13 (FIGS. 3 and 4) of the portal 3.

The slide 4 comprises a plate 27 (FIGS. 3 and 4) on which are slidable, in the manner to be described hereinafter, the arm 5 and a frame 28 (FIG. 4) which is arranged to co-operate with the guides 25 and 26 of the cross-piece 9. Between these guides and the frame 28 there are disposed two like sets of four bearings, one of which can be seen in FIG. 4.

Each set of bearings comprises a pair of bearings 29, 31 (FIGS. 3 and 4) with a load-bearing function which are arranged to co-operate with the guides 25 and a pair of guide bearings 30, 32 which are arranged to co-operate with the guides 26. The pairs of bearings 29–30 and 31–32 of each set have axes contained in one and the same vertical plane. In particular, the plane of the pair 29–30 is at a distance from the axis of the arm 5 (FIG. 3) different from that of the pair 31–32. The mounting of each bearing on the frame 28 (FIG. 4) is effected by the same methods hereinbefore described with reference to the bearings 14, 15 and 16 (FIG. 2) of the bases 10 and 11 of the portal 3.

Figure 6:
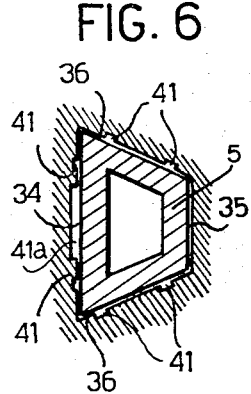
FIG. 6 is a section of the arm with which the apparatus is equipped, the section being taken in the plane of the line VI-VI.

As can be seen in FIG. 6, the arm 5 has in section substantially the form of an isosceles trapezoid and is defined by a pair of parallel faces 34, 35, the smaller one of which 35 faces towards the cross-piece 9, and by a pair of inclined equal faces 36. The aforesaid arm 5 is slidable in a pair of collars 37, 38 (FIG. 4) fast with the plate 27 of the slide 4 and provided with holes with a section corresponding to that of the arm. In the faces of these holes which are coupled respectively with the faces 34 and 36 of the arm 5 there are formed cavities or grooves 41 arranged to be placed in communication, by means of suitable holes and conduits (not shown), with the compressed-air supply system which will be described hereinafter. A duct 41a (FIG. 6) serves for the discharge of the air.

The upper end of the arm 5 is connected by means of a cross-member 43 (FIGS. 3 and 4) to a rod 44 (FIG. 3) which forms part of a pneumatic cylinder 45 and which is fast with a piston 46 of the said cylinder. The chamber 47 of this cylinder is in communication with the aforesaid system by means of conduits (not shown) on which there is arranged a manual pressure regulator 48.

Figure 4:
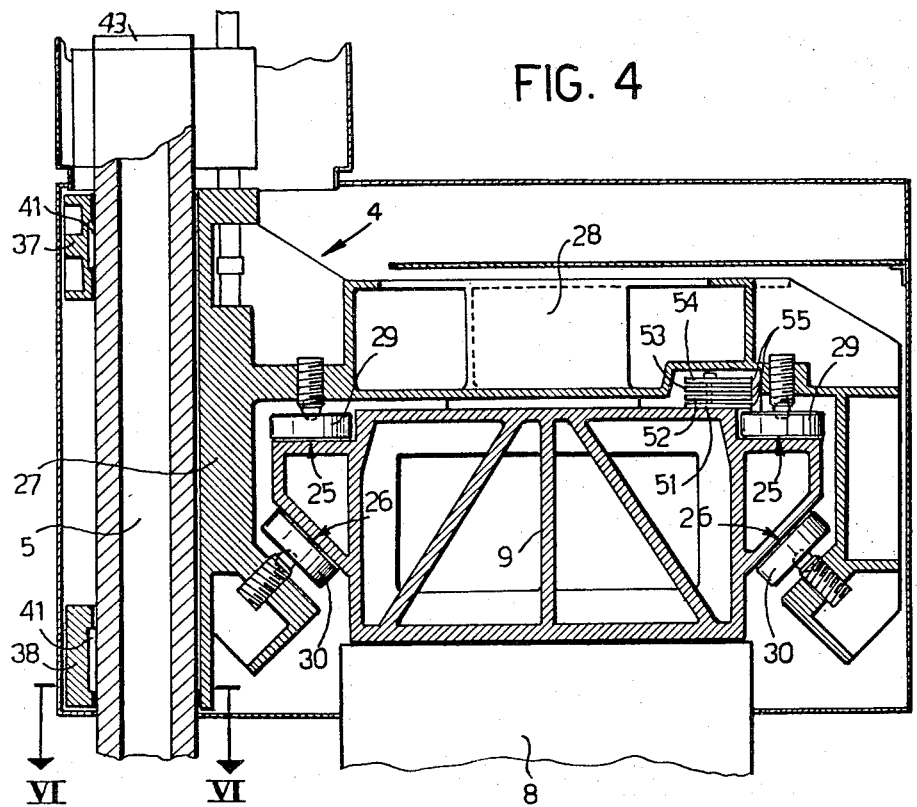
FIG. 4 is a section of the cross-piece of FIG. 3 taken in the plane of the line IV—IV.
Figure 5:
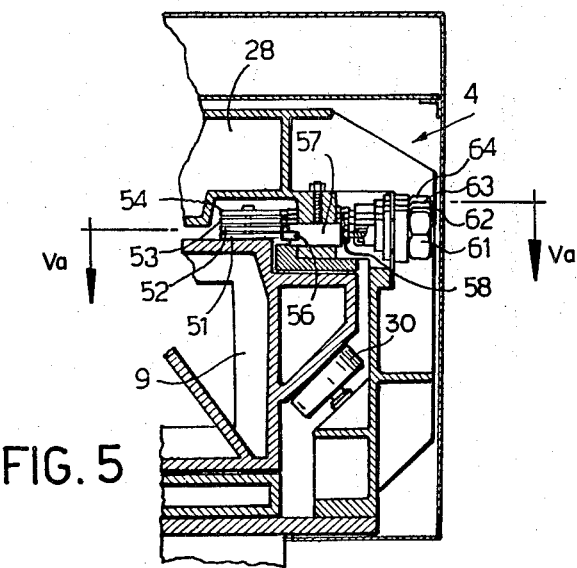
FIG. 5 is a section of part of the cross-piece similar to that of FIG. 4, but taken in a different plane.
Figure 5A:
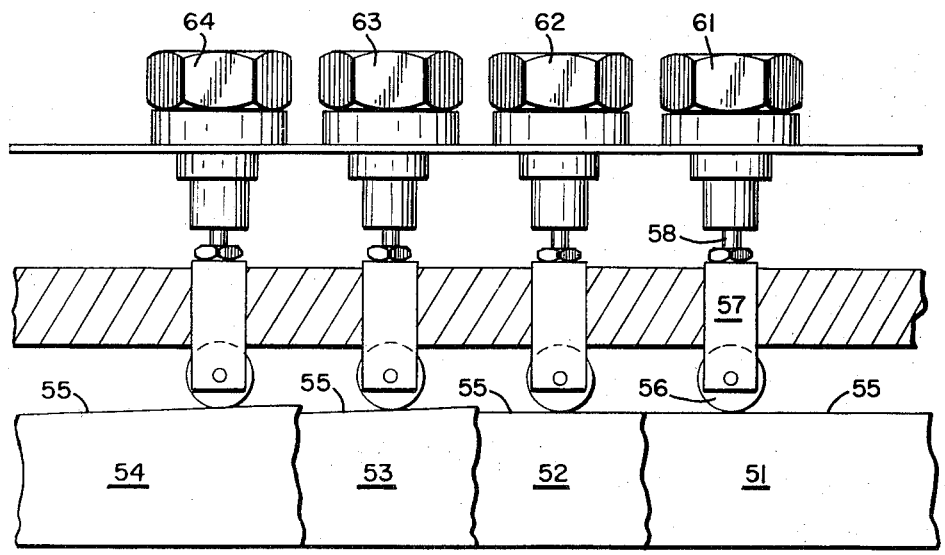
FIG. 5a is a partial plan view of a detail of FIG. 5 taken according line Va—Va thereof, in an enlarged scale.

On the top wall of the cross-piece 9 (FIGS. 3, 4, 5 and 5a) there are fixed, for example by means of screws and spacers, four cams 51, 52, 53 and 54, each of which is constituted by a metal rule provided with a substantially rectilinear active profile 55 (FIG. 4) in the case of the cams 51 and 52, shown diagrammatically in FIG. 8, and a substantially curvilinear active profile in the case of the cams 53, 54, as will be better described hereinafter. With the active profile 55 of each of these cams there co-operates a cam follower 56 (FIG. 5) which can turn on a pin carried by a slide 57 (FIG. 5a) movable axially within a hole in the frame 28 and arranged to control a push rod 58 of corresponding pressure regulators 61, 62, 63 and 64 (FIG. 8), each of which is associated with one of the cams 51–54 (FIG. 5). These regulators are inserted between a source of compressed air which forms part of the aforesaid air distribution system, and the bearings 15, 14 (FIG. 2) and 29 and 31 (FIGS. 3 and 4), respectively.

Figure 7:
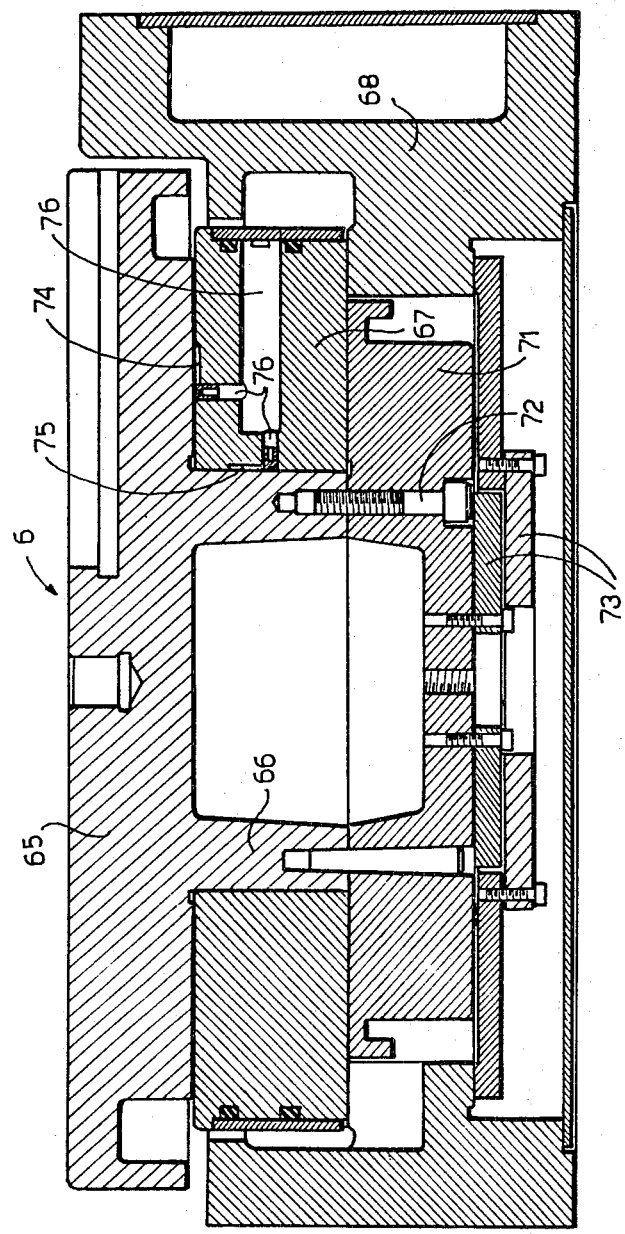
FIG. 7 is a section of the piece or workpiece table of the apparatus of FIG. 1, the section being taken in the plane of the line VII—VII.

The workpiece table 6 (FIGS. 1 and 7) comprises a disc 65 a cylindrical projection 66 of which is engaged in a corresponding hole of an annular element 67. This element is fixed to a support 68 fast in turn with the base 1 (FIG. 1). Between the cylindrical projection 66 and the base 68 there is disposed a position indicator, for example of the Inductosyn type, comprising two discs 73 (FIG. 7), one of which is fixed to a disc 71 fixed in turn by means of bolts 72 to the projection 66 and the other to the support 68. The position indicator may, however, be of any other known type.

In the top surface and in the surface of the hole of the annular element 67 there are formed cavities or grooves 74 and 75, respectively, communicating by means of holes 76 with the air distribution system.

Figure 8:
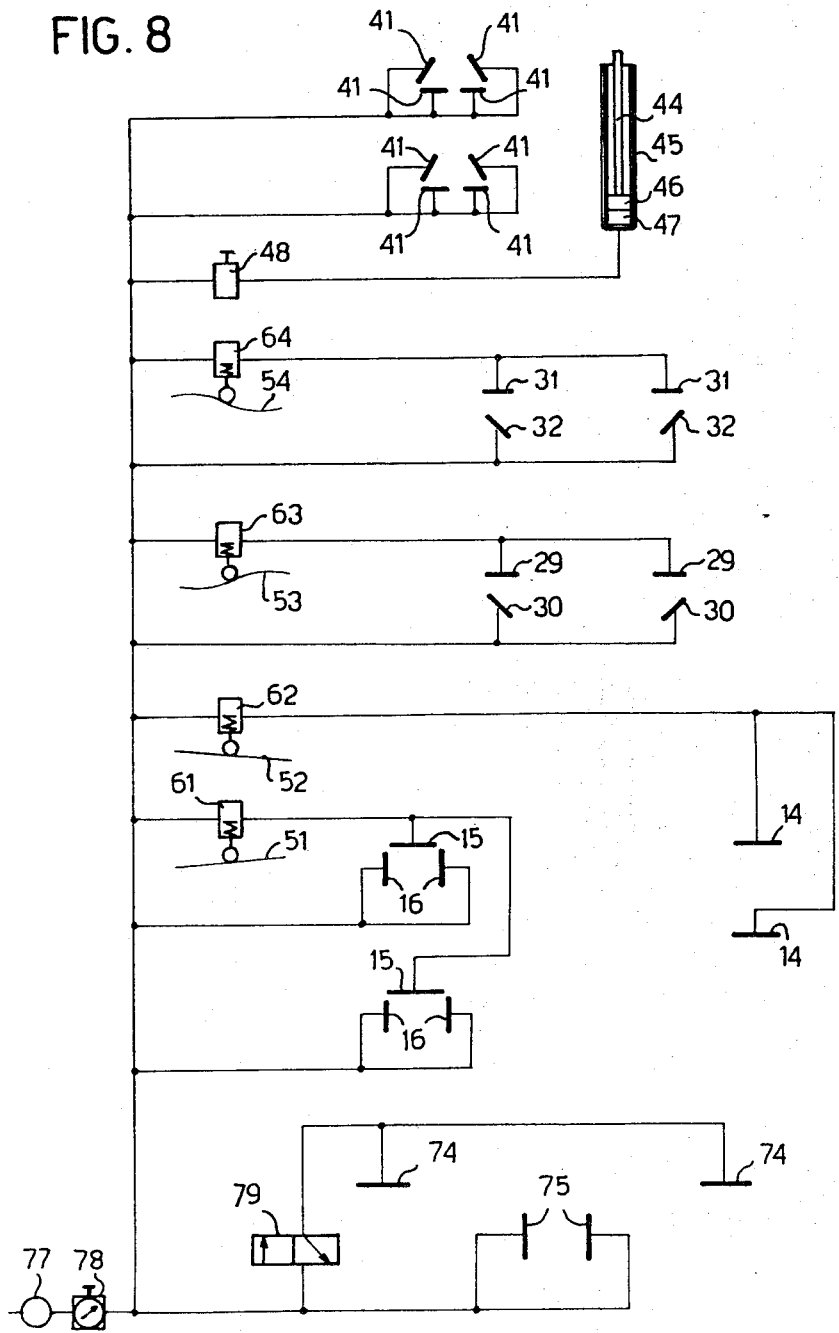
FIG. 8 is a diagram of the network for supplying compressed air to the apparatus.

A distribution system of the type shown in FIG. 8 is arranged to feed compressed air to the various pneumostatic-support bearings which form part of the described measuring apparatus. Compressed air coming from any suitable source, for example from a works compressed air plant, through a filter 77 (FIG. 8) and a general pressure regulator with a pressure gauge 78 is delivered, with distribution in parallel, to the various bearings of the measuring apparatus. In FIG. 8, these bearings are shown diagrammatically and marked with the same reference numbers that are used in the preceding Figures.

The pressure of the air supplied to the load-bearing bearings 15 of the base 11 of the portal 3 (FIG. 2) is regulated by the pressure regulator 61 (FIG. 8) controlled by the cam 51, while that of the air supplied to the load-bearing bearings 14 (FIG. 2) of the other base 10 is regulated by the pressure regulator 62 (FIG. 8) controlled by the cam 52. The pressure of the air supplied to the bearings 29 and 31 (FIG. 3) of the slide 4 is controlled by the pressure regulators 63 and 64, respectively, associated with the cams 53 and 54. The pressure of the air inside the chamber 47 (FIGS. 8 and 3) of the cylinder 45 can be regulated by means of the manual pressure regulator 48, while a distributor 79 (FIG. 8) allows the cavities 74 (FIGS. 8 and 7) of the table 6 to be connected when the table is to be rotated to the source of compressed air.

Operation of the measuring apparatus described takes place in the following manner. A part or workpiece to be measured (not shown) is fixed to the workpiece table 6 (FIG. 1) and a suitable feeler is connected to the lower end of the arm 5, the feeler being arranged to be brought into contact with parts of the surface of the aforesaid workpiece. By gripping the arm 5 with the hand, it is possible to bring it into desired successive positions to which there correspond movements along the axis $x$, $y$ and $z$ which are both measured by measuring means known per se, with which the apparatus is provided, and indicated by indicating means, also known per se, connected to the measuring means.

During a movement of the portal 3 with respect to the base 1, the portal is supported by the two bearings 14 (FIG. 2) of the base 10 and by the two bearings 15 of the base 11. During this movement, the four bearings 16 of the base 11 simply have a lateral guiding or centering function. As is known, the pneumatic support of the portal 3 with respect to the guides 2 of the base 1 takes place by means of a layer of compressed air which flows between the surface of the bearings and the facing surface of the guides 2 on which these bearings rest. Therefore, on passing from the inoperative condition of these bearings to the working condition, there is an upward displacement of the bearings with respect to the bearing surfaces, which displacement may be of the order of some ten microns in the case of the bearings 14 and 15 of the portal 3. If, during the support of the portal 3, the resultant of the weights P of the slide 4 is on the mid line of the cross-piece 9, as is shown diagrammatically in FIG. 9, it can be assumed that the same raising $s$ of the two bearings 14 and 15 has taken place. In fact, in this case, both the pressure of the air supplied to each bearing and the weight bearing down thereon are the same. If, on the other hand, as is happening in FIG. 10, the aforesaid resultant is shifted by $x$ from the mid line of the cross-piece, the weight of the slide 4 is not distributed uniformly over the bearings 14 and 15, but in the ratio:

$$l + 2x/l - 2x;$$

where $l$ is the distance between the axes of the bearings.

This ratio is determined taking account of the fact that the reactions R, R' on the bearings 14 and 15, respectively, which are produced by the sole load P have the following relations:

$$R' = P(1/2 - x/l); R = P(1/2 + x/l).$$

Figure 9:
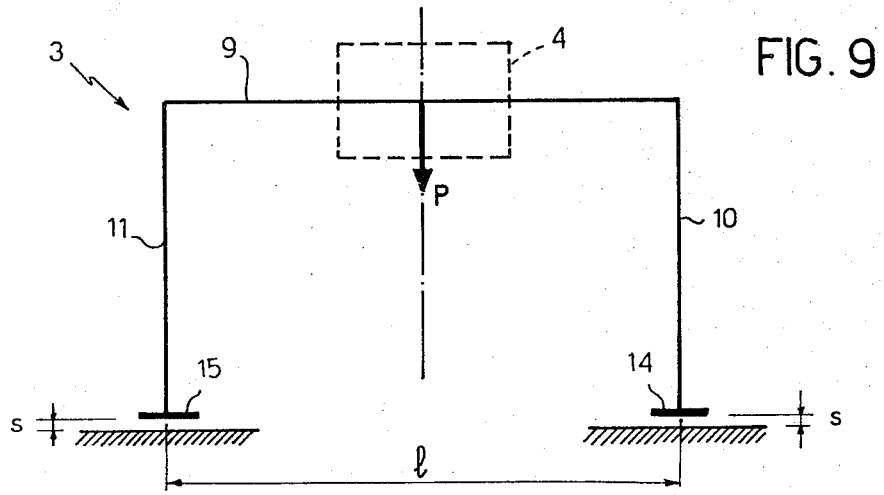
FIGS. 9 and 10 show diagrammatically two different positions or sets of the portal of the apparatus in correspondence with two different positions of the slide on which the feeler of the apparatus is mounted.

Therefore, by shifting the slide 4 on the cross-piece 9, the loads weighing on the bearings 14 and 15 increase and decrease linearly, producing corresponding shifts or movements $-\Delta s$ and $+\Delta s$ of the bearings where $s$ is the spacing obtaining in FIG. 9. In consequence, the slide 4 assumes a location or set which is slightly rotated with respect to the configuration of FIG. 9. It is obvious that because of this location, which varies with variation of the displacement $x$ of the slide 4 with respect to the mid line of the cross-piece 9, measuring errors occur.

With the measuring apparatus embodying the invention, these errors are eliminated by means of automatic correction of the shifts $-\Delta s$ and $+\Delta s$ of the bearings 14 and 15, which takes place in the following manner.

Figure 10:
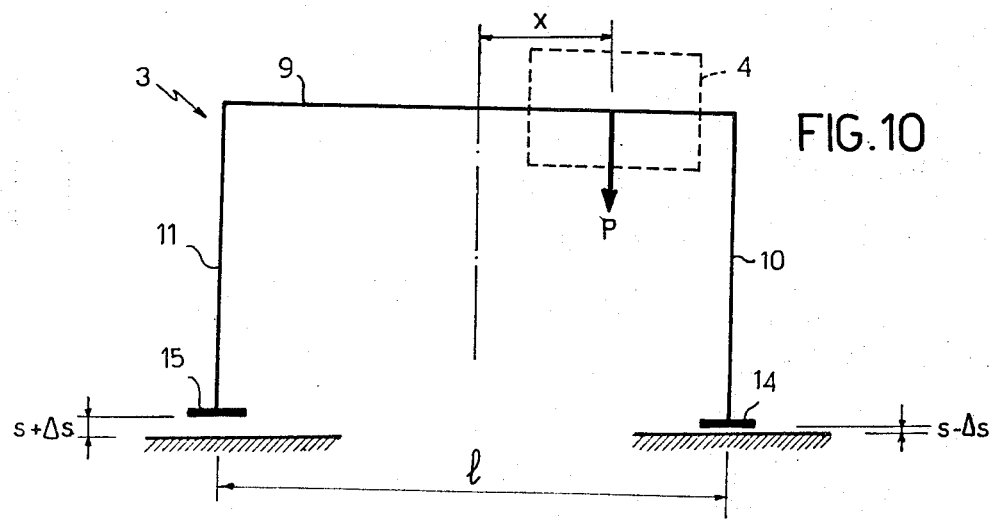

The cams 51 and 52 (FIGS. 3, 4 and 5), the active profile 55 of which is rectilinear, as has been said, are positioned in such a manner as to displace the two push rods 58 (FIG. 5) of the corresponding pressure regulators 61 and 62 equally when the resultant P is on the mid line of the cross-piece. In consequence, air at the same pressure arrives at the bearings 14 and 15 (FIGS. 8 and 2) and there is therefore the same lift or raising $s$ (FIG. 9) at these bearings. When the slide 4 is shifted, for example, to the right as shown in FIG. 10, the profile of the cam 52 (FIGS. 5 and 8) displaces the push rod 58 of the pressure regulator 62 in such manner as to cause the pressure of the air delivered to the bearings 14 to increase to produce, with this higher pressure, a raising of the bearings equal to $\Delta s$. At the same time, the profile of the cam 51 displaces the push rod 58 of the regulator 61 in such manner as to reduce the pressure of the air delivered to the bearings 15 to produce a reduction in the lift of these bearings equal to $\Delta s$. Since the variations in the load on the bearings 14 and 15 and the variations in the lifts $s$ produced by the loads are proportional to the coordinate $x$ (FIG. 10), in order to obtain the aforesaid variations in pressure it is simply necessary for the profiles of the cams 51 and 52 to be rectilinear. These cams are therefore simply constituted by metal rules with straight edges which are suitably inclined with respect to the sliding direction of the slide 4.

Figure 11:
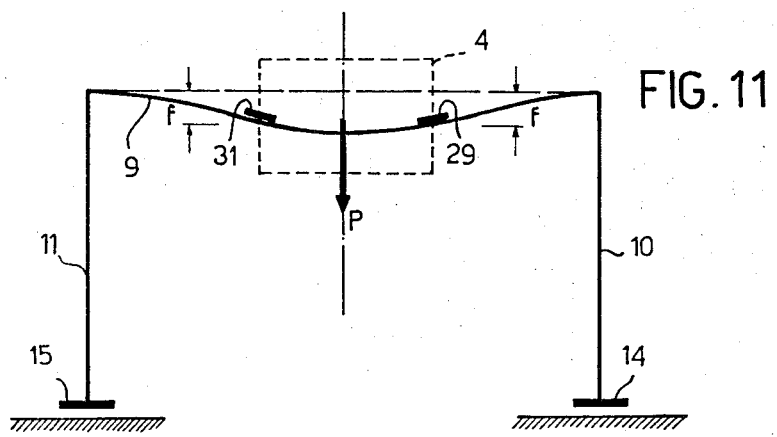
FIGS. 11 and 12 show diagrammatically an elastic deformation of the cross-piece of the portal and the position of the slide with respect to the cross-piece, before and after, respectively, the correction of position or set of the slide with respect to the cross-piece.

During the movement of the slide 4 (FIGS. 3 and 4) with respect to the cross-piece 9, support is effected by the bearings 29 and 31, while the bearings 30 and 32 simply have a guiding and opposing function. If the resultant P (FIG. 11) of the loads of the slide 4 is on the mid line of the cross-piece 9, as is shown in FIG. 11, there is an elastic deformation of the cross-piece corresponding to that of a beam supported at the ends and which can be represented diagrammatically by the curved line shown in the drawing. Because of the vertical shift of the points of the cross-piece (this shift being exaggerated in the drawing itself for greater clarity), at the bearings 29 and 31 (FIG. 11) of the slide 4 there is a lowering of the slide with respect to the theoretical position corresponding to an ideal cross-piece free from elastic deformation. The value of this shift is equal to the dimension $f$ from the curved line at the bearings 29 and 31.

Figure 13:
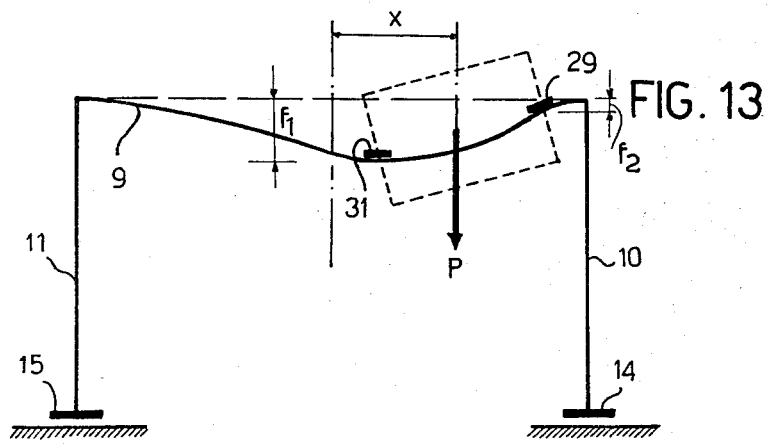
FIGS. 13 and 14 show diagrammatically another elastic deformation of the cross-piece of the portal and the position of the slide with respect to the cross-piece, before and after, respectively, the correction of the position or set of the slide with respect to the cross-piece.

In the case in which the said resultant is shifted by $x$ from the mid line of the cross-piece 9 (FIG. 13), the elastic deformation of the cross-piece assumes a configuration different from the preceding one as shown by the curved line appearing in FIG. 13. In this case, at the bearings 31 and 29 there are vertical downward shifts which are respectively equal to the $f_1$ and $f_2$, measured at the bearings. The result is that, not only is there a vertical shift of the slide 4 as happened in the preceding case, but also a rotation of the slide. It can therefore be seen that, because of the elastic deformation of the cross-piece 9, there is a vertical shift and a rotation of the slide 4 the values of which depend on the position of the centre of gravity of the slide with respect to the mid line of the cross-piece. The aforesaid shift and rotation, which are obviously sources of measuring errors, can be corrected automatically in the measuring apparatus in the following manner.

Figure 12:
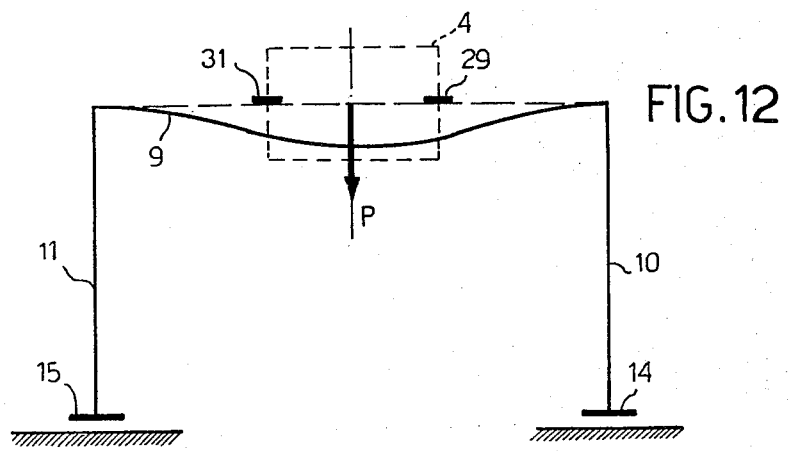

When the load P (FIG. 11) of the slide 4 is on the mid line of the cross-piece, as is shown in FIG. 11, the active profiles 55 (FIG. 4) of the cams 53 and 54 (FIGS. 3 and 5) are such as to produce displacements of the push rods 58 (FIG. 5) of the pressure regulators 63 and 64 for supplying compressed air to the bearings 29 and 31 (FIGS. 3 and 8) at the same pressure and able to produce a raising of these bearings with respect to the cross-piece 9 (FIG. 11) which is suibstantially equal to $f$. In this way, the position of the slide 4 is brought into the theoretical position corresponding to that of the underformed cross-piece 9 (FIG. 12).

Figure 14:
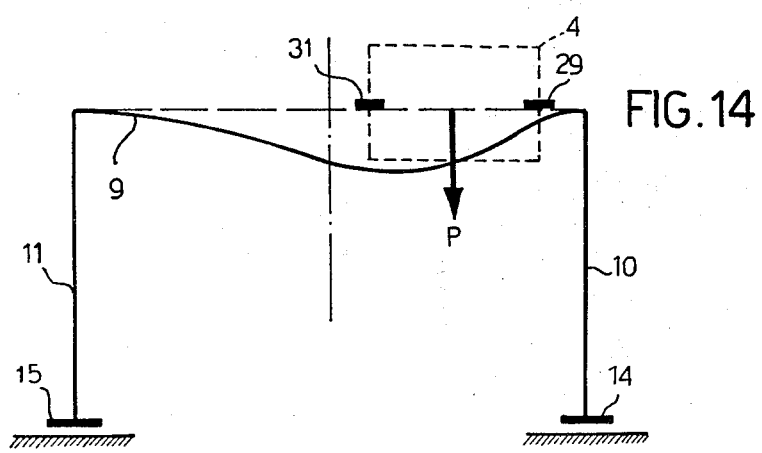

If the slide 4 is shifted by $x$ with respect to the mid line of the cross-piece 9 (FIG. 13), the active profiles of the cams 53 and 54 (FIGS. 3 and 5) are such as to cause a displacement of the push rods 58 of the pressure regulators 63 and 64 (FIGS. 5 and 8) to feed to the bearings 31 air with a pressure greater than that supplied to the bearings 29. The values of these pressures are chosen in such manner as to produce raising movements of the bearings with respect to the cross-piece 9 which are substantially equal to $f_1$ and $f_2$ (FIG. 13) to bring the slide 4 into the position of FIG. 14.

The profile of the cams 53 and 54 is obviously not linear and can be determined, for example, analytically by tracing a plurality of curved lines of the type shown in FIGS. 11 and 13, one for each position of the slide 4 on the cross-piece 9. These lines can be drawn easily if the variation of the moment of inertia of the cross-piece 9 along the axis $x$ is known. More conveniently, the profile of these cams can be formed by means of tests effected on the measuring apparatus in a manner which is entirely obvious.

To cause the disc 65 (FIG. 7) of the workpiece table 6 to rotate, it is sufficient, by operating the distributor 79 (FIG. 8), to deliver air under pressure to the bearings 74 (FIGS. 7 and 8) of the table. In this way, a raising of the disc 65 with respect to the annular element 67 is obtained and therefore a rotation of the disc with respect to this element is permitted with very little friction. During this rotation, the compressed air delivered to the cavities 75 of the aforesaid element centres the assembly consisting of the table 6 and the workpiece and considerably reduces the friction also between the outer surface of the cylindrical projection 66 and the surface of the hole of the same element.

Figure 3:
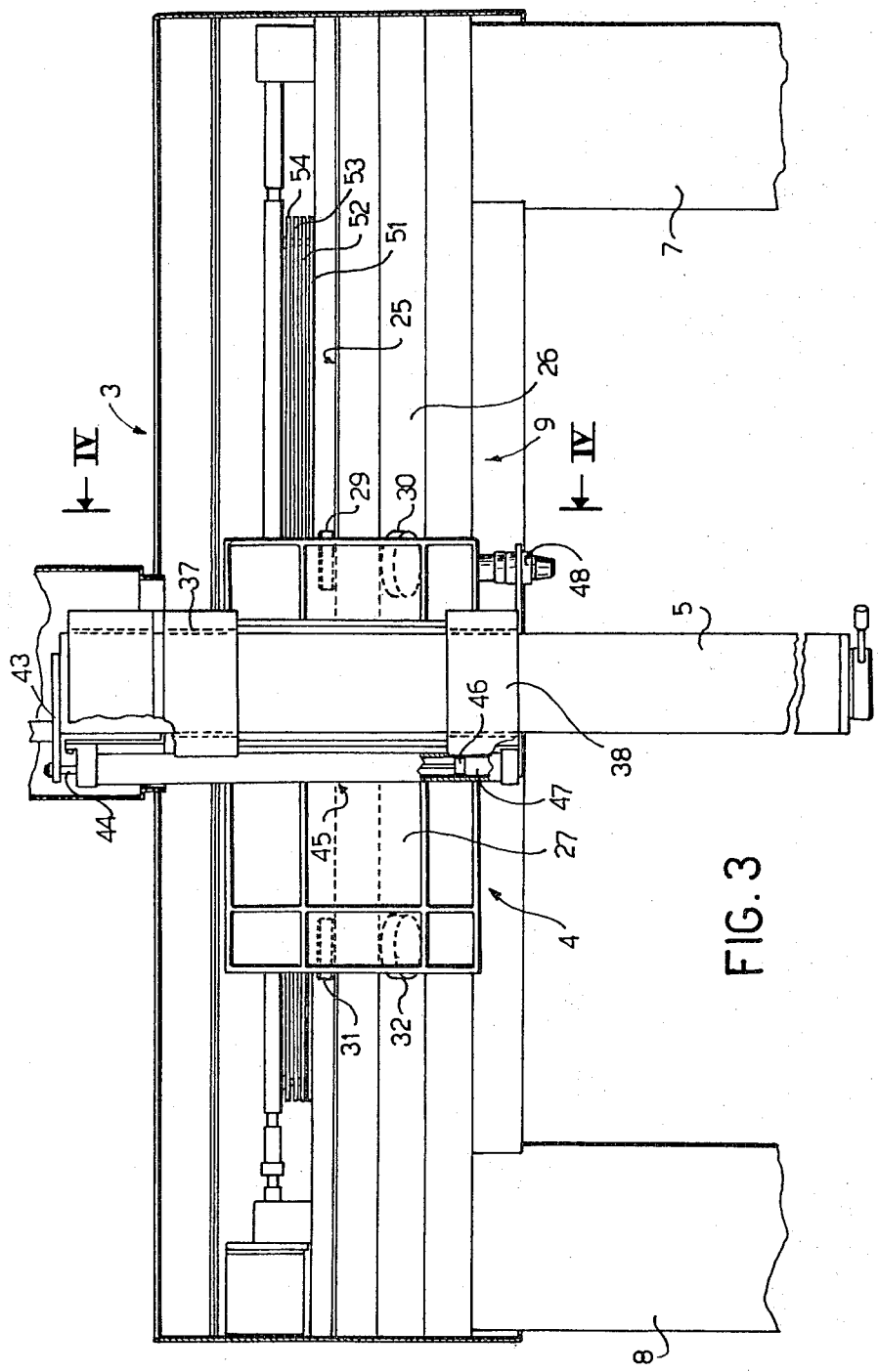
FIG. 3 is a front view, with some parts removed, of the cross-piece of the portal of the apparatus of FIG. 1.

The main effect of the presence of compressed air in the cavities 41 (FIG. 6) of the collars 37 and 38 (FIG. 4) is the self-centering of the arm 5 with respect to the collars 37 and 38. Consequently, owing to the absence of contact of the faces 34, 35 and 36 (FIG. 6), the movement of the arm 5 with respect to the slide 4 takes place with minimum friction. During this movement, the weight of the arm 5 and of the feeler mounted thereon is balanced by the compressed air delivered to the chamber 47 (FIGS. 3 and 8) of the cylinder 45 and acting on the piston 46 of this cylinder. The balancing action can be regulated according to the weight of the feeler by varying the pressure of the air inside the chamber 47, which is effected by adjusting the manual pressure regulator 48 (FIGS. 3 and 8).

What we claim is:

1. A measuring station comprising a base, a portal having a pair of uprights and a cross-piece, first guide means on said base including first pneumostatically supported bearings for slidably mounting said uprights, a slide carrying a feeler, and second guide means on said cross-piece including second pneumostatically supported bearings for slidably mounting said slide, wherein the improvement comprises control means including at least a pressure regulator for varying the pressure of the air fed to one of said bearings, and a cam co-operating with said pressure regulator during the movement of the slide with respect to the cross-piece, the pressure regulator being fixed to the slide or to the cross-piece and the cam to the cross-piece or to the slide, respectively, so as to produce a relative movement of the regulator with respect to the cam during the shifting of the slide with respect to the cross-piece, to correct variations in the set of said slide with respect to said base.

2. Measuring station according to claim 1, wherein the said pressure regulator is prearranged for varying the pressure of the air fed to the bearings of each upright proportionally to the variations in load produced on each of said first bearings to correct the variations in the set of the portal with respect to the base.

3. Measuring station according to claim 1, wherein said pressure regulator is prearranged to vary the pressure of the air fed to said second bearings proportionally to the movements of the points of the guides of the cross-piece on which the said bearings rest to correct the variations in the set of the slide with respect to the cross-piece which are produced by elastic deformations of the cross-piece itself.

4. Measuring station according to claim 1, wherein said control means includes two pressure regulators each of which is associated with one of said uprights, and two cams operatively associated with said regulators to control each one of the pressure of the air of the bearings of the associated upright.

5. Measuring station according to claim 4, wherein each upright comprises two bearings disposed symmetrically with respect to the mid line of the upright itself.

6. Measuring station according to claim 5, wherein said guide means for each upright includes an upper surface and a pair of parallel lateral surfaces, comprising an upright bearing of at least one upright, and a pair of bearings associated on said resting on the lateral surfaces of the said pair of parallel lateral surfaces.

7. Measuring station according to claim 1, wherein said slide is provided with two sets of bearings spaced apart in the direction of the axis of said cross-piece, said control means comprising another pressure regulator each associated with another cam, said pressure regulators controlling the pressure of the air of the bearings of one of the aforesaid two sets.

8. Measuring station according to claim 7, wherein each of the said sets of bearings comprises two bearings each of which is slidable on a corresponding guide, these guides being on opposite sides with respect to the cross-piece and being contained in the same plane.

9. Measuring station according to claim 8, wherein said two bearings of each set are associated with another two bearings, each one sliding on a corresponding guide which is contained in a plane inclined with respect to that containing the aforesaid guides of the cross-piece.

10. Measuring station according to claim 9, characterised by the fact that the said inclined planes form a dihedral angle substantially of 90°.

* * * * *